3,093,175
MACHINE FOR TREATING TOMATOES WITH LYE SOLUTION, WASHING AND TRIMMING SAME
Alfred A. Morici, San Jose, Calif., assignor to Hershel California Fruit Products Co. Inc., a corporation of California
Filed Apr. 1, 1960, Ser. No. 19,391
3 Claims. (Cl. 146—52)

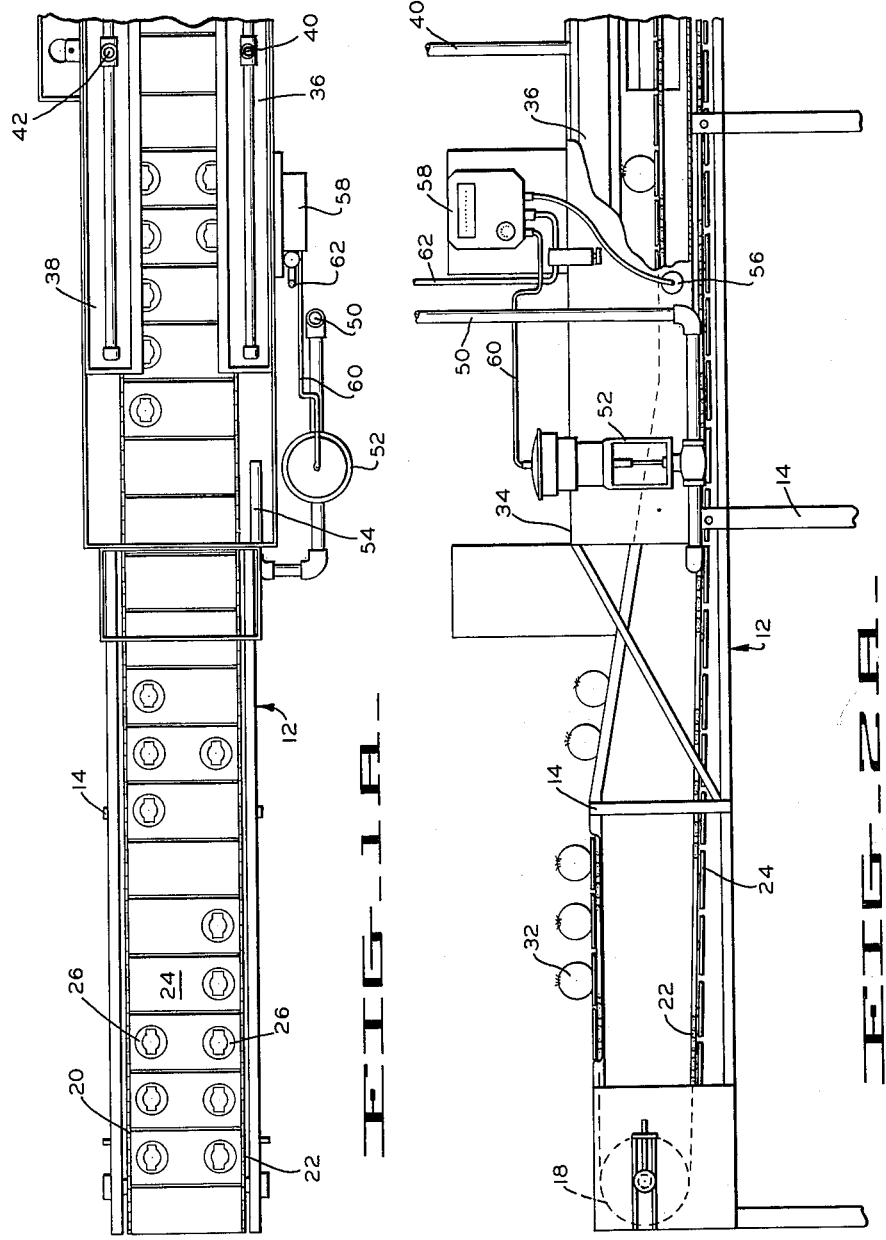

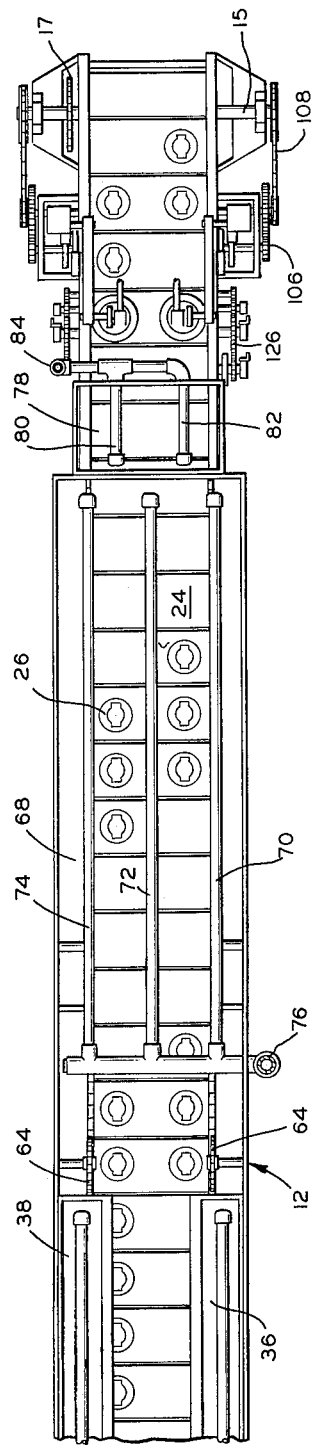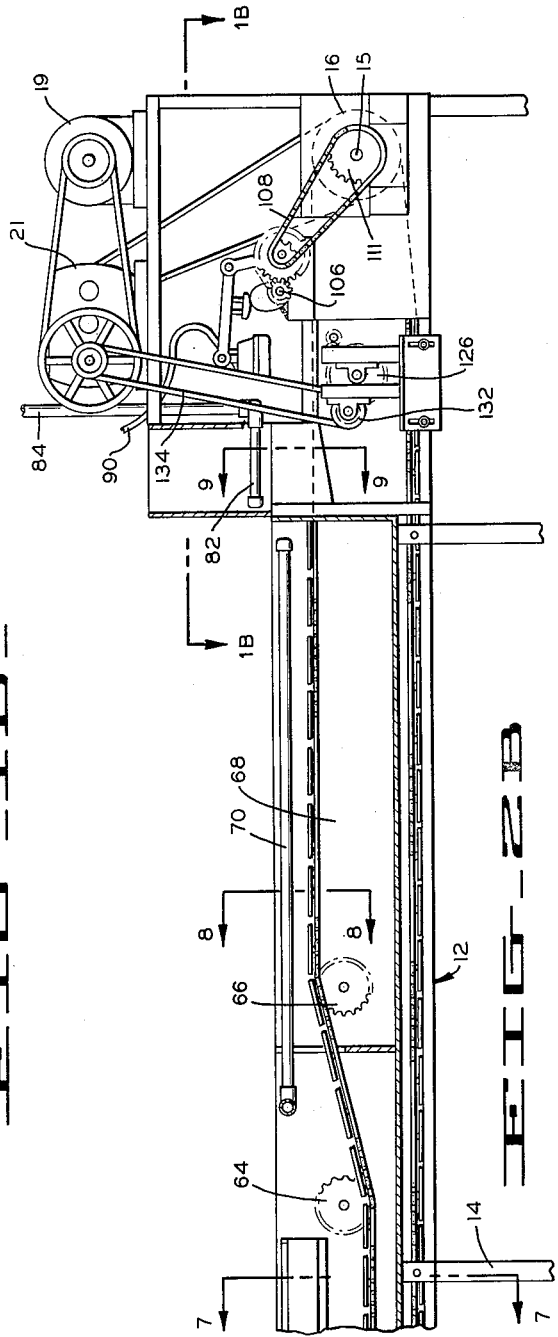

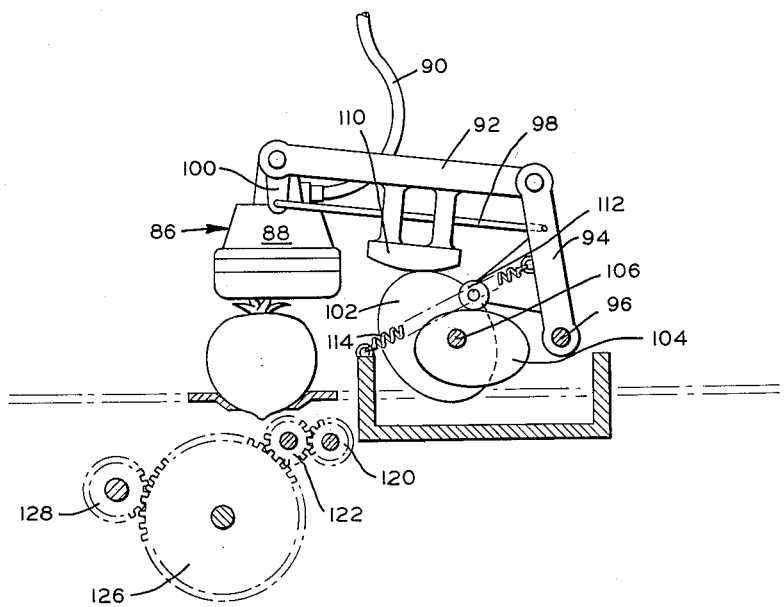
FIG_3_
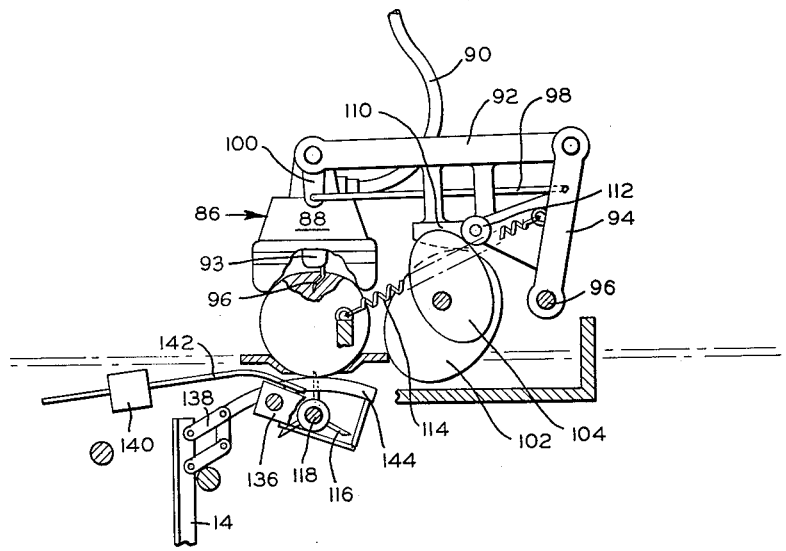
FIG_4_
INVENTOR.
ALFRED A. MORICI
BY Eckhoff and Slick
ATTORNEYS

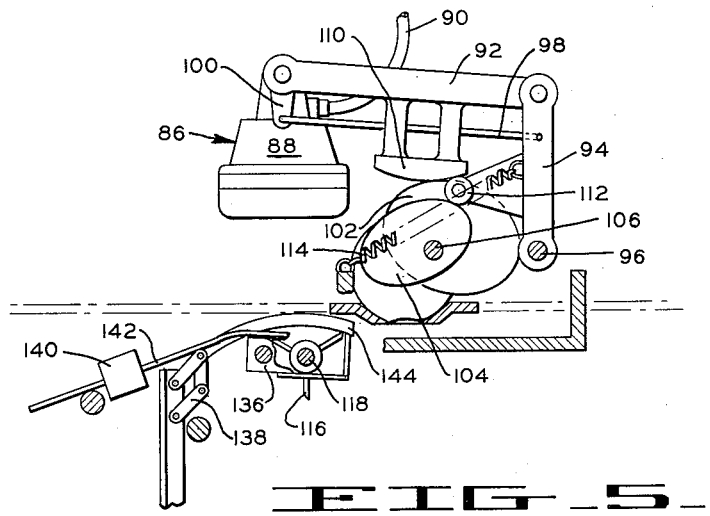
FIG_5_
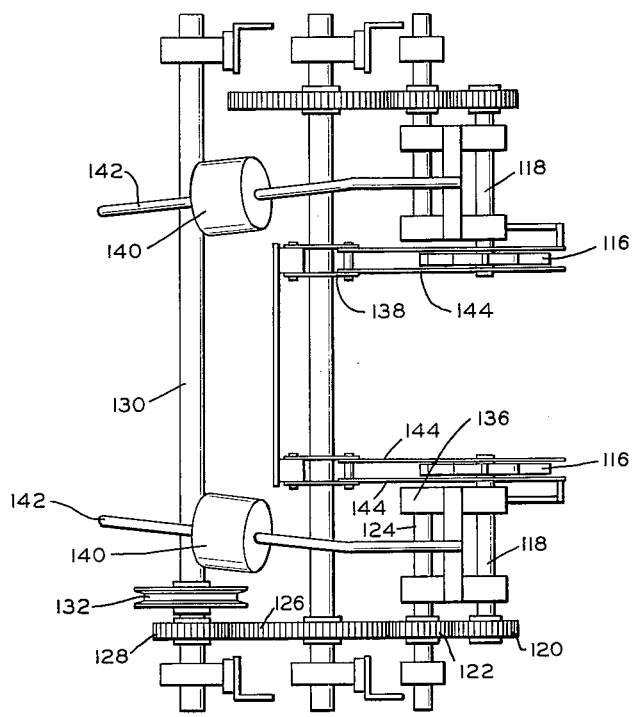
FIG_6_
INVENTOR.
ALFRED A. MORICI
BY
ATTORNEYS

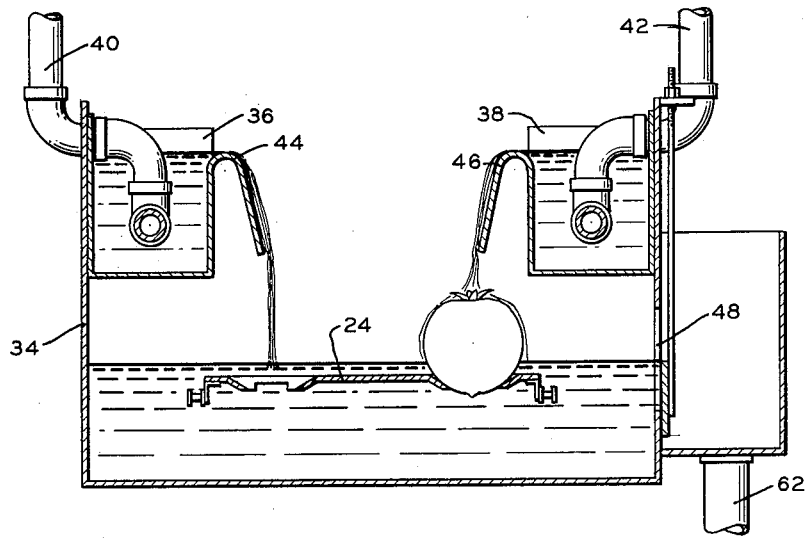
FIG_7_
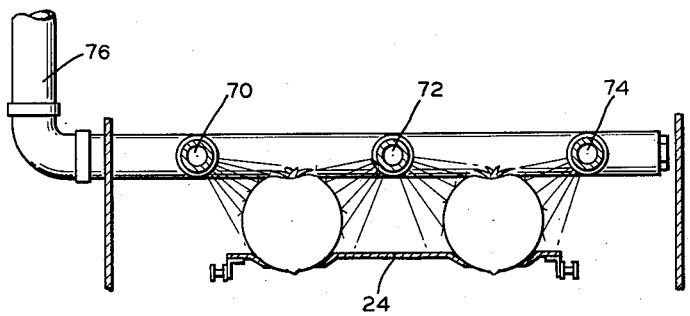
FIG_8_
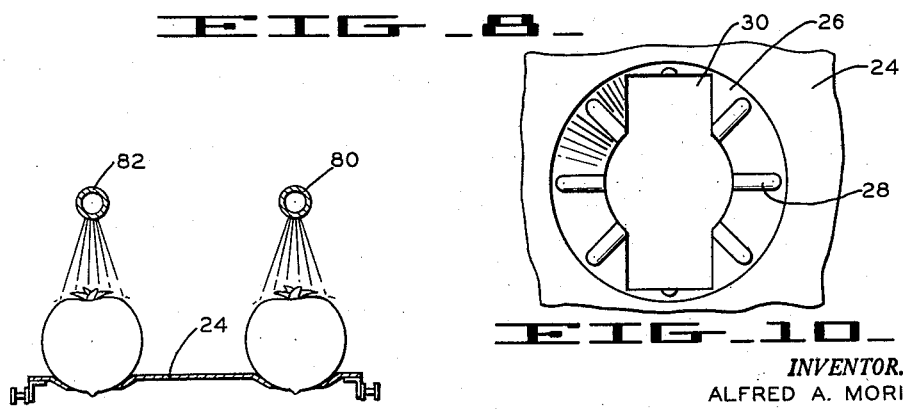
FIG_10_
FIG_9_
INVENTOR.
ALFRED A. MORICI
ATTORNEYS United States Patent Office 3,093,175
Patented June 11, 1963

This invention relates to a tomato processing machine and more particularly to a machine wherein tomatoes are successively treated with lye, hot water, cold water and then have their stems and calyx ends removed all in one continuous operation.

It is an object of the present invention to produce a machine whereby tomatoes, or similar fruit, can be placed on a conveyor and are successively treated with lye, hot water, cold water and have the stems and calyx ends removed so that the tomatoes are prepared for skinning all in one continuous automatic operation.

Another object of this invention is to provide a machine wherein tomatoes are passed through a lye bath only partially submerged while the tomatoes are subjected to a spray of a lye solution.

Still another object of this invention is to provide a tomato processing machine wherein tomatoes have the stems and calyx ends removed therefrom simultaneously.

Other objects will be apparent from the balance of the specification which follows.

In the drawings forming part of this application:

FIGURE 1 is a plan view of the machine of the present invention; FIGURE 1–A being of the left or intake end, while FIGURE 1–B is of the right or discharge end.

FIGURE 2 is a side elevation of the machine shown in FIGURE 1, FIGURE 2–A corresponding to FIGURE 1–A and FIGURE 2–B corresponding with FIGURE 1–B.

FIGURES 3, 4 and 5 are enlarged side elevational views of the coring and trimming mechanisms.

FIGURE 6 is an enlarged plan view of the trimming mechanism.

FIGURES 7, 8 and 9 are enlarged cross-sections taken at the lye bath, scalding and cooling areas on the lines 7—7, 8—8 and 9—9, respectively, of FIGURE 2–B.

FIGURE 10 is an enlarged plan view of a tomato transporting cup.

Referring now to the drawings by reference characters, the machine has a frame generally designated 12 having a series of support members 14. Located at opposite ends of frame 12 are two pairs of sprockets consisting of the two driven sprockets 16 and the idler sprockets 18. Sprocket 16 is keyed to shaft 15 and a sprocket 17 is keyed to the same shaft. Sprocket 17 is driven from the prime mover 19 acting through a reduction unit 21. Parallel endless roller chains 20 and 22 are trained about the two pairs of sprockets forming a long, generally horizontal conveying path. Mounted between the two roller chains 20 and 22 are a series of slats 24, each of which has mounted thereon a pair of tomato holding cups 26. The tomato holding cups 26 are generally round and have a dished configuration. The cups has a series of ridges 28 thereon which tend to hold the fruit steady. The cups have a generally rectangular cut-out portion 30 therein, the purpose of which will be later explained.

As the conveyor slats move along (to the right in FIGURES 1 and 2), tomatoes 32 are placed in each of the tomato transporting cups with the stem end up. The tomato transporting cups then advance into the lye tank generally designated 34. The lye tank 34 has two parallel spaced troughs 36 and 38 which are supplied with lye solution from the lines 40 and 42. The troughs 36 and 38 have lips 44 and 46 thereon so that lye flows over the lips and onto the tomatoes passing thereunder as is shown in the righthand side of FIGURE 7. Thus, as the tomatoes pass through the lye tank they pass through a continuous curtain of lye solution. The lye tank 34 has an overflow outlet 48 positioned in such a manner that the depth of the solution in the lye tank is maintained at a point not over about ⅓ the height of the tomatoes being conveyed therethrough. In this manner, there is no danger of the tomatoes floating off or becoming dislodged from the cups.

In order to maintain the lye at the desired temperature, steam is introduced through the line 50 through the valve 52 and into the heater unit 54. A thermostat 56 is immersed in the lye solution and actuates the controller 58 which regulates the valve 52 by controlling water pressure in the line 60. Water for actuating purposes is introduced through line 62. Normally, the lye bath is maintained at about 210° F. The lye solution which is withdrawn through the overflow 48 is taken through the line 62 whereupon the lye is circulated through a heater to a make-up tank, not shown, and then re-circulated through the lines 40 and 42.

As the tomatoes leave the lye tank, the roller chains pass under the idler rollers 64 and over the idler rollers 66 and into the water spray section designated 68. The water spray section is provided with three parallel pipes 70, 72 and 74 which are supplied with water from the line 76. It will be noticed that the tomatoes are sprayed from both sides. The water from these sprays is substantially at boiling temperature so that the tomatoes are scalded.

After leaving the hot water tank 68, the tomatoes pass to the cold water section 78 which is provided with two parallel pipes 80 and 82 which are supplied with cold water from line 84. The temperature of the water is about 40° F. The shock of spraying the tomatoes with cold water immediately after they have been sprayed with hot water, coupled with the action of the lye solution, loosens the skins of the tomatoes so that they can be easily removed in a subsequent operation.

The tomatoes then pass to the coring and trimming section. The stem end removal will be first described although both actions take place substantially simultaneously. The stem end removal is accomplished with a cutting head 86 which is well-known to those skilled in the art and which does not form part of the present invention. The cutter head 86 comprises a housing 88 having a turbine therein, not illustrated, driven by water from line 90. The turbine turns the shaft 93 to which is attached the knife 95 which rotates at a high rate of speed. Thus, the rotating knife cuts out the stem end of the fruit while the water discharged from the turbine washes the cut-away portions from the fruit. In order to provide for automatic operation it is necessary that the cutter head 86 descend squarely upon the top of the fruit, and move with it for a short distance down the conveyor line while the cutting operation is being accomplished. To accomplish this action, the cutter head 86 is mounted on the arm 92 which in turn is pivoted to the arm 94 which is free to turn on the shaft 96. A rod 98 is provided between an extension 100 on the cutter head and the arm 94 in such a manner that a parallelogram linkage is provided. The cams 102 and 104 are mounted on the shaft 106 which is driven by the chain 108 from a sprocket 110. Sprocket 110 is mounted on the same shaft as the conveyor belt drive sprocket 16 so that the shaft 106 is driven in synchronism with the conveyor belt. The arm 92 is provided with a cam follower 110 while the arm 94 is provided with the cam follower 112. A spring 114 urges arm 94 downwardly and to the left so that both of the cam followers are kept engaged with their respective cams, In this manner, the cup 86 is brought down and over a fruit on the conveyor belt, follows the fruit for a short distance down the path of the conveyor belt, and then is lifted and moved to the left so that the operation can be repeated.

For removing the calyx end, a series of three chisel-like knives 116 are mounted on the shaft 118. A gear 120 engages a gear 122 mounted on the shaft 124. This gear engages gear 126 which in turn engages gear 128 mounted on shaft 130 which is provided with pulley 132 driven by means of the belt 134. The shafts 118 and 124 are mounted on the holder 136 which is in turn carried by the parallelogram linkage 138 on the frame 14 of the machine. In this manner, the knives are revolved at a high rate of speed, yet can move up and down freely over a limited range. A counterweight 140 mounted on the rod 142 attached to the holder 136 tends to urge the holder 136 upwardly. The guides 144 mounted on each side of the knife 116 and carried by the holder 136 contact the bottom of the fruit, as is shown in FIGURE 4, regulating the height to which the knives can rise. The counterweight 140 can be adjusted to different positions to exert different degrees of pressure against the fruit, since tomatoes of different configurations require more or less pressure.

After the bottom has been trimmed from the fruit, it passes the right end of the machine in a condition wherein the skin can be readily removed, as by passing the fruit through a perforated rubber boot.

Although the machine has been described as processing two parallel rows of fruit, it is obvious that the machine could be built as a single line machine or that three or more parallel lines could be provided.

I claim:

1. A tomato processing machine capable of maintaining a tomato in a single predetermined position throughout said processing comprising:
   (a) an endless conveyor;
   (b) a series of tomato-holding cups on said conveyor;
   (c) a lye tank along the path of travel of said conveyor, said conveyor being mounted for horizontal travel through the said lye tank;
   (d) means for maintaining the level of lye in the said tank above the said conveyor whereby to envelope the lower portion of a tomato in one of the said cups but at a level beneath that at which the said tomato will float free of the said cup;
   (e) spray means mounted overhead and in path of travel of the said conveyor in the area of the said lye tank;
   (f) means for conveying a lye solution to the said spray means whereby to provide means for subjecting tomatoes on the said cups to the action of a spray of lye solution;
   (g) spray means mounted over the path of travel of the said conveyor immediately after the said lye tank;
   (h) means for conveying hot water to the said last mentioned spray means whereby to provide means for subjecting the tomatoes to the action of hot water spray;
   (i) spray means immediately following the said hot water spray means;
   (j) means for conveying cold water to the said last mentioned spray means whereby to subject tomatoes on the said cups to the action of a cold water spray;
   (k) means for removing the stem and calyx of each tomato on each of the said cups, said means being positioned subsequent to the said cold water spray means.

2. The structure of claim 1 wherein each of the said tomato-holding cups comprises a generally circular dish having a central rectangular slot therein, said slot extending in the direction of movement of said conveyor; wherein there is provided a rotatable knife positioned along the path of travel of the said conveyor and beneath said conveyor; and wherein there is provided means for rotating said knife.

3. In a tomato processing machine, a stem and calyx removing section for use in conjunction with a tomato-holding cup of generally dish-shaped configuration, said cup being mounted on a continuously moving conveyor and having a slot in the bottom thereof extending in the direction of the movement of the said conveyor, said calyx removing section comprising:
   (a) a knife mounted for rotation about a horizontal axis perpendicular to the direction of movement of the said conveyor, said knife being positioned in the path of movement of the said cup immediately below the said cup so that when the said cup passes over the said knife, the said knife will enter the said slot and contact the calyx end of the said tomato; and
   (b) at least a single guide positioned immediately below the path of travel of the said cup, said guide being vertically movable relative to said tomato-holding cup and positioned to contact the bottom of a tomato protruding through the said opening in a cup, said guide being operatively associated with said knife to control the vertical position of the said knife whereby to limit penetration of the knife into the bottom of the said tomato.

References Cited in the file of this patent

UNITED STATES PATENTS

| | | |
|---|---|---|
| 850,655 | Judge | Apr. 16, 1907 |
| 972,812 | Burns | Oct. 18, 1910 |
| 1,396,268 | Dunkley | Nov. 8, 1921 |
| 1,448,532 | Harding | Mar. 13, 1923 |
| 1,769,664 | Duncan | July 1, 1930 |
| 2,788,037 | Carter | Apr. 9, 1957 |
| 2,822,843 | Morici | Feb. 11, 1958 |